US012617364B2

(12) United States Patent
Lozano Omana et al.

(10) Patent No.: US 12,617,364 B2
(45) Date of Patent: May 5, 2026

(54) SIDE AIRBAG ASSEMBLY

(71) Applicant: Ford Global Technologies, LLC, Dearborn, MI (US)

(72) Inventors: Fernando Lozano Omana, Cuauhtemoc (MX); Joel Alonso Vazquez, Mexico City (MX); Jesus Alfonso Alarcon Hernandez, Toluca (MX); Dante Arturo Rodriguez Camacho, Texcoco (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/885,816

(22) Filed: Sep. 16, 2024

(65) Prior Publication Data

US 2026/0077736 A1     Mar. 19, 2026

(51) Int. Cl.
| | |
|---|---|
| B60R 21/207 | (2006.01) |
| B60R 21/231 | (2011.01) |
| B60R 21/2338 | (2011.01) |
| B60R 21/00 | (2006.01) |

(52) U.S. Cl.
CPC ...... B60R 21/207 (2013.01); B60R 21/23138 (2013.01); B60R 21/2338 (2013.01); *B60R 2021/0006* (2013.01); *B60R 2021/23146* (2013.01)

(58) Field of Classification Search
CPC ............ B60R 21/207; B60R 21/23138; B60R 2021/23146
See application file for complete search history.

(56) References Cited

U.S. PATENT DOCUMENTS

| | | | | | |
|---|---|---|---|---|---|
| 3,623,768 | A | * | 11/1971 | Capener | B60N 2/757 |
| | | | | | 280/730.2 |
| 5,505,487 | A | * | 4/1996 | Brown | B60R 21/207 |
| | | | | | 280/741 |
| 6,568,754 | B1 | * | 5/2003 | Norton | B60N 2/865 |
| | | | | | 297/216.12 |
| 7,874,578 | B2 | * | 1/2011 | Thomas | B60R 21/216 |
| | | | | | 280/730.2 |
| 8,985,622 | B1 | * | 3/2015 | Cannon | B60R 21/231 |
| | | | | | 280/730.2 |
| 9,238,425 | B2 | * | 1/2016 | Fukawatase | B60R 21/013 |
| 10,272,865 | B2 | * | 4/2019 | Nagasawa | B60R 21/18 |
| 10,343,644 | B2 | * | 7/2019 | Dry | B60R 21/2334 |
| 10,399,529 | B2 | * | 9/2019 | Spahn | B60R 21/231 |

(Continued)

FOREIGN PATENT DOCUMENTS

| | | |
|---|---|---|
| DE | 102020101621 A1 | 7/2021 |
| JP | 2010120411 A | 6/2010 |

*Primary Examiner* — Jason D Shanske
*Assistant Examiner* — Joselynn Y Sliteris
(74) *Attorney, Agent, or Firm* — Frank A. MacKenzie; Brooks Kushman P.C.

(57) ABSTRACT

A vehicle includes a side airbag assembly including a tray and an airbag. The vehicle includes a vehicle seat that includes a seatback frame having an outboard side and an inboard side spaced from the outboard side in an inboard direction. The vehicle seat includes a tray supported by the seatback frame. The tray is movable relative to the seatback frame in the inboard direction from an undeployed position to a deployed position. The vehicle seat includes an airbag supported by the tray and movable with the tray from the undeployed position to the deployed position.

13 Claims, 8 Drawing Sheets

(56) References Cited

U.S. PATENT DOCUMENTS

| | | | | |
|---|---|---|---|---|
| 10,479,310 | B2 * | 11/2019 | Dry | B60N 2/79 |
| 10,513,206 | B2 * | 12/2019 | Spahn | B60N 2/4279 |
| 10,583,797 | B2 * | 3/2020 | Line | B60N 2/42763 |
| 10,632,952 | B2 * | 4/2020 | Markusic | B60R 21/231 |
| 10,723,249 | B2 * | 7/2020 | Dry | B60N 2/753 |
| 10,843,652 | B2 | 11/2020 | Byun et al. | |
| 10,940,822 | B2 * | 3/2021 | Niikuni | B60R 21/207 |
| 11,235,728 | B2 * | 2/2022 | Kobayashi | B60R 21/207 |
| 11,318,905 | B2 | 5/2022 | Kang | |
| 11,358,554 | B1 * | 6/2022 | Jaradi | B60R 21/231 |
| 11,400,879 | B2 * | 8/2022 | Kang | B60N 2/42727 |
| 11,440,495 | B2 * | 9/2022 | Yetukuri | B60R 21/2334 |
| 11,634,098 | B1 * | 4/2023 | Line | B60N 2/77 |
| | | | | 280/730.2 |
| 11,667,258 | B1 * | 6/2023 | Golman | B60R 21/214 |
| | | | | 280/728.1 |
| 11,702,025 | B1 * | 7/2023 | Jaradi | B60R 21/01554 |
| | | | | 280/730.1 |
| 11,752,967 | B2 | 9/2023 | Kobayashi et al. | |
| 2016/0052477 | A1 * | 2/2016 | Tobata | B60N 2/42 |
| | | | | 280/730.1 |

* cited by examiner

SIDE AIRBAG ASSEMBLY

BACKGROUND

A side airbag is mounted to a seatback and is inflatable along a side of an occupant, specifically along the torso and/or head of the occupant. The side airbag, for example, may be inflatable between the occupant and a vehicle door. The side airbag controls the kinematics of the occupant in vehicle impacts that urge the occupant in a cross-vehicle direction, e.g., a side impact.

DETAILED DESCRIPTION

Figure 1:
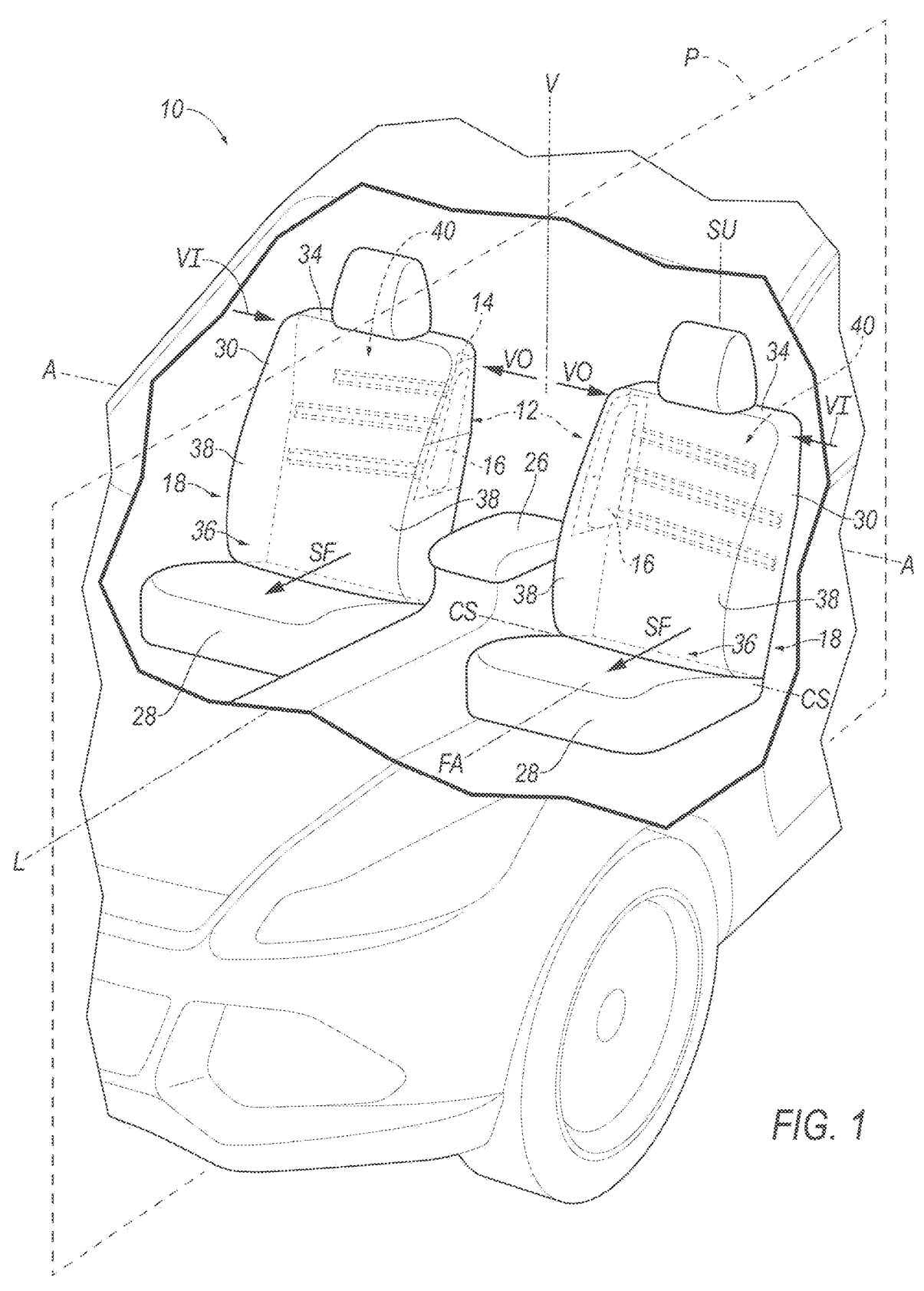
FIG. 1 is a cutaway view of a vehicle showing two side airbag assemblies in undeployed positions in hidden lines.

A vehicle seat includes a seatback frame having an outboard side and an inboard side spaced from the outboard side in an inboard direction. A tray is supported by the seatback frame and is movable relative to the seatback frame in the inboard direction from an undeployed position to a deployed position. An airbag is supported by the tray and is movable with the tray from the undeployed position to the deployed position.

The tray may be at the inboard side of the seatback frame in the undeployed position The vehicle seat may include a track between the tray and the seatback frame. The tray may move along the track from the undeployed position to the deployed position. The track may include a rail fixed to the seatback frame and a sliding member fixed to the tray. The sliding member may be slidably engaged with the rail. The vehicle seat may include an actuator between the rail and the sliding member to move the sliding member relative to the rail.

The vehicle seat may include an actuator between the seatback frame and the tray to move the tray from the undeployed position to the deployed position.

The vehicle seat may include a pyrotechnic actuator between the seatback frame and the tray to move the tray from the undeployed position to the deployed position.

The rail may have a first end and a second end spaced from the first end in an inboard direction. The second end may be higher than the first end.

The vehicle seat may include an inflator in fluid communication with the airbag. The inflator may be supported by the tray and may be moveable with the tray from the undeployed position to the deployed position.

The tray may include a first wall extending in the cross-seat direction and a second wall extending from the first wall in a seat-forward direction. The second wall may include a bottom portion and a top portion extending from the bottom portion toward an upright midline of the seatback frame.

The vehicle seat may include a tether between the airbag and the tray.

A vehicle includes a seatback frame and a tray supported by the seatback frame. The tray is movable relative to the seatback frame in a vehicle-inboard direction from an undeployed position to a deployed position. An airbag is supported by the tray and is movable with the tray from the undeployed position to the deployed position. An actuator is between the seatback frame and the tray to move the tray from the undeployed position to the deployed position. A computer has a processor and memory storing instructions executable by the processor to actuate the actuator in response to detection of certain vehicle impacts and detection of absence of an occupant vehicle inboard of the seatback frame.

The vehicle includes an inflator in fluid communication with the airbag and the memory may store instructions executable by the processor to actuate the inflator in response to detection of certain vehicle impacts. The inflator may be supported by the tray and may be moveable with the tray from the undeployed position to the deployed position.

The actuator may be a pyrotechnic actuator.

The tray may include a first wall extending in the vehicle-inboard direction and a second wall extending from the first wall in a vehicle-forward direction. The second wall may include a bottom portion and a top portion extending from the bottom portion in a vehicle-outboard direction.

With reference to the Figures, wherein like numerals indicate like parts throughout the several views, a vehicle 10 includes a side airbag assembly 12 including a tray 14 and an airbag 16. The vehicle 10 includes a vehicle seat 18 that includes a seatback frame 20 having an outboard side 22 and an inboard side 24 spaced from the outboard side 22 in an inboard direction. The vehicle seat 18 includes a tray 14 supported by the seatback frame 20. The tray 14 is movable relative to the seatback frame 20 in the inboard direction from an undeployed position (FIG. 1) to a deployed position (e.g., one seat 18 in FIG. 2, and FIGS. 4-5). The vehicle seat 18 includes an airbag 16 supported by the tray 14 and movable with the tray 14 from the undeployed position to the deployed position.

The tray 14 and the airbag 16 may be moved to the deployed position, and the airbag 16 may be inflated, in response to detection of certain vehicle impacts, e.g., far-side impacts. Since the airbag 16 is supported by the tray 14 and movable with the tray 14 to the deployed position, the tray 14 and the airbag 16 can be positioned to be recessed relative to the seatback frame 20 in the undeployed position. In the deployed position, the tray 14 positions the airbag 16 away from the seatback frame 20 for inflation of the airbag 16. The airbag 16 is supported by the tray 14 in the deployed position, and when the airbag 16 inflates, the tray 14 acts as a reaction surface for the airbag 16.

The vehicle 10 may be any suitable type of automobile, e.g., a passenger or commercial automobile such as a sedan, a coupe, a truck, a sport utility, a crossover, a van, a minivan, a taxi, a bus, etc. The vehicle 10 defines an occupant cabin. With reference to FIG. 1, the vehicle 10 defines a vehicle-longitudinal axis L extending between a front end (not numbered) and a rear-end (not numbered) of the vehicle 10. The vehicle 10 defines a vehicle-lateral axis A extending cross-vehicle from one side to the other side of the vehicle 10. The vehicle 10 defines a vertical axis V extending through a floor and ceiling of the vehicle 10. The vehicle-longitudinal axis L, the vehicle-lateral axis A, and the vertical axis V are perpendicular relative to each other. The vehicle 10 includes a longitudinal plane P and the longitudinal axis L is on the longitudinal plane P. A vehicle-inboard direction VI is a direction along the vehicle-lateral axis A toward the longitudinal plane P. A vehicle-outboard direction VO is a direction along the vehicle-lateral axis A away from the longitudinal plane P.

The vehicle 10 includes doors openable for occupants to enter and exit the occupant cabin. Each door may include at least one door panel and a door-trim panel supported on the door panel. The door panel may be metal (such as steel, aluminum, etc.) or polymeric (such as fiber reinforced plastic composite, etc.). The door-trim panel may include a covering 34 that may include upholstery, padding, etc. The door-trim panel may include an armrest elongated along the vehicle-longitudinal direction when the door is in the closed position.

The vehicle 10 includes one or more seats 18 in the occupant cabin. The vehicle 10 may include any suitable number of seats 18. The seats 18 may be arranged in the occupant cabin in any suitable position, i.e., as front seats, rear seats, third-row seats, etc. The seat 18 may be movable relative to the floor to various positions, e.g., movable fore-and-aft and/or cross-vehicle. The seats 18 may be of any suitable type, e.g., a bucket seat. In the example shown in FIGS. 1 and 2, the vehicle 10 includes two front seats on opposite sides of the longitudinal axis L of the vehicle 10 and each including the side airbag assembly 12. In other example, any seat 18 in any position of the vehicle 10 may include the side airbag assembly 12.

The seat 18 includes an inboard side 24 and an outboard side 22, i.e., a seat-inboard side 24 and a seat-outboard side 22. The inboard side 24 is spaced from the outboard side 22. When the seat 18 is in a forward-facing position, as shown in the example in FIGS. 1 and 2, the inboard side 24 of the seat 18 is vehicle-inboard of the outboard side 22 of the seat 18, and the outboard side 22 of the seat 18 is vehicle-outboard of the inboard side 24 of the seat 18. In the example shown in FIGS. 1 and 2, the inboard side 24 of the seat 18 is between the outboard side 22 and the middle console 26, and the outboard side 22 of the seat 18 is between the inboard side 24 and an adjacent door. The inboard side 24 of the seat 18 is spaced from the outboard side 22 of the seat 18 in the inboard direction. The inboard direction from the outboard side 22 of the seat 18 to the inboard side 24 of the seat 18 may be the same as the vehicle-inboard direction VI, as shown in the example in the Figures.

The seat 18 defines a seat-forward direction SF. The seat-forward direction SF extends forward relative to the seat 18. For example, the seat-forward direction SF may extend from a rear of the seat 18 to a front of the vehicle seat 18 relative to an occupant of the seat 18, i.e., the occupant of the vehicle seat 18 faces in the seat-forward direction SF when properly seated in the seat 18. A seat bottom 28 extends from the seatback 30 in the seat-forward direction SF. The vehicle seat 18 defines a cross-seat axis CS and a seat-upright axis SU. The forward-facing axis FA, the cross-seat axis CS, and the seat-upright axis SU are perpendicular to each other. The forward-facing axis FA is parallel with the vehicle-longitudinal axis L when the seat 18 is forward facing, the cross-seat axis CS is parallel with the vehicle-lateral axis L when the seat 18 is forward facing, and the seat-upright axis SU extends through the vehicle 10 floor and the vehicle 10 roof when the seatback 30 is in an upright position.

The seat 18 includes the seatback 30 and the seat bottom 28. The seat bottom 28 extends from the seatback 30 in the seat-forward direction SF. The seat-forward direction SF may be parallel to the longitudinal L of the vehicle 10, i.e., when the seat 18 is facing a forward direction. The seatback 30 may be supported by the seat bottom 28 and may be stationary or movable relative to the seat bottom 28. The seatback 30 and the seat bottom 28 may be adjustable in multiple degrees of freedom. Specifically, the seatback 30 and the seat bottom 28 may themselves be adjustable, in other words, adjustable components within the seatback 30 and/or the seat bottom 28, and/or may be adjustable relative to each other.

The seatback 30 includes the seatback frame 20 and a covering 34 supported on the seatback frame 20. The seatback frame 20 may include tubes, beams, etc. Specifically, the seatback frame 20 includes a pair of upright frame members 32. The upright frame members 32 are elongated, and specifically, are elongated in a generally upright direction when the seatback 30 is in a generally upright position. The upright frame members 32 are spaced from each other and the seatback frame 20 includes cross-members (not shown) extending between the upright frame members 32. The seatback frame 20, including the upright frame members 32, may be of any suitable plastic material, e.g., carbon fiber reinforced plastic (CFRP), glass fiber-reinforced semi-finished thermoplastic composite (organosheet), etc. As another example, some or all components of the seatback frame 20 may be formed of a suitable metal, e.g., steel, aluminum, etc.

The covering 34 may include upholstery and padding. The upholstery may be cloth, leather, faux leather, or any other suitable material. The upholstery may be stitched in panels around the frame. The padding may be between the covering 34 and the seatback frame 20 and may be foam or any other suitable material.

The seatback frame 20 includes an inboard side 24 and an outboard side 22. The inboard side 24 of the seatback frame 20 is at the inboard side 24 of the seat 18, and the outboard side 22 of the seatback frame 20 is at the outboard side 22 of the seat 18.

The seat 18, specifically the seatback 30 and the seat bottom 28, define an occupant seating area 36. The occupant seating area 36 is the space occupied by an occupant properly seated on the seat 18. The occupant seating area 36 is seat-forward of the seatback 30 and above the seat bottom 28. The occupant seating area 36 is on a front side of the seatback 30. The side airbag 16 may extend from the seatback 30 next to the occupant seating area 36 to control occupant kinematics.

The seatback 30 may have bolsters 38 on opposite sides of the occupant seating area 36. One bolster 38 is on the inboard side 24 of the seat 18 and one bolster 38 is on the outboard side 22 of the seat 18, and specifically, one bolster 38 may be on the inboard side 24 of the seat 18 frame and the other bolster 38 may be on the outboard side 22 of the seat 18 frame. The bolsters 38 are elongated, and specifically, are elongated in a generally upright direction when the seatback 30 is in a generally upright position. The bolsters 38 define cross-seat boundaries of the seatback 30, i.e., the seatback 30 terminates at the bolsters 38. The bolsters 38 may extend in the seat-forward direction SF relative to the occupant seating area 36, i.e., on opposite sides of the torso and shoulders of an occupant seated on the seat 18 assembly. The extension of the bolsters 38 relative to the occupant seating area 36 may be defined by the upright frame members 32 and/or the covering 34. In the example shown in the Figures, the size and shape of both the upright frame members 32 and the covering 34 form the bolsters 38.

The vehicle 10 includes a seatbelt assembly (not shown) for each seat 18. The seatbelt assembly may be a three-point harness, meaning that the webbing is attached at three points around the occupant when fastened: the anchor, the seatbelt retractor, and the buckle. The seatbelt assembly may, in other examples, include another arrangement of attachment points.

Figure 2:
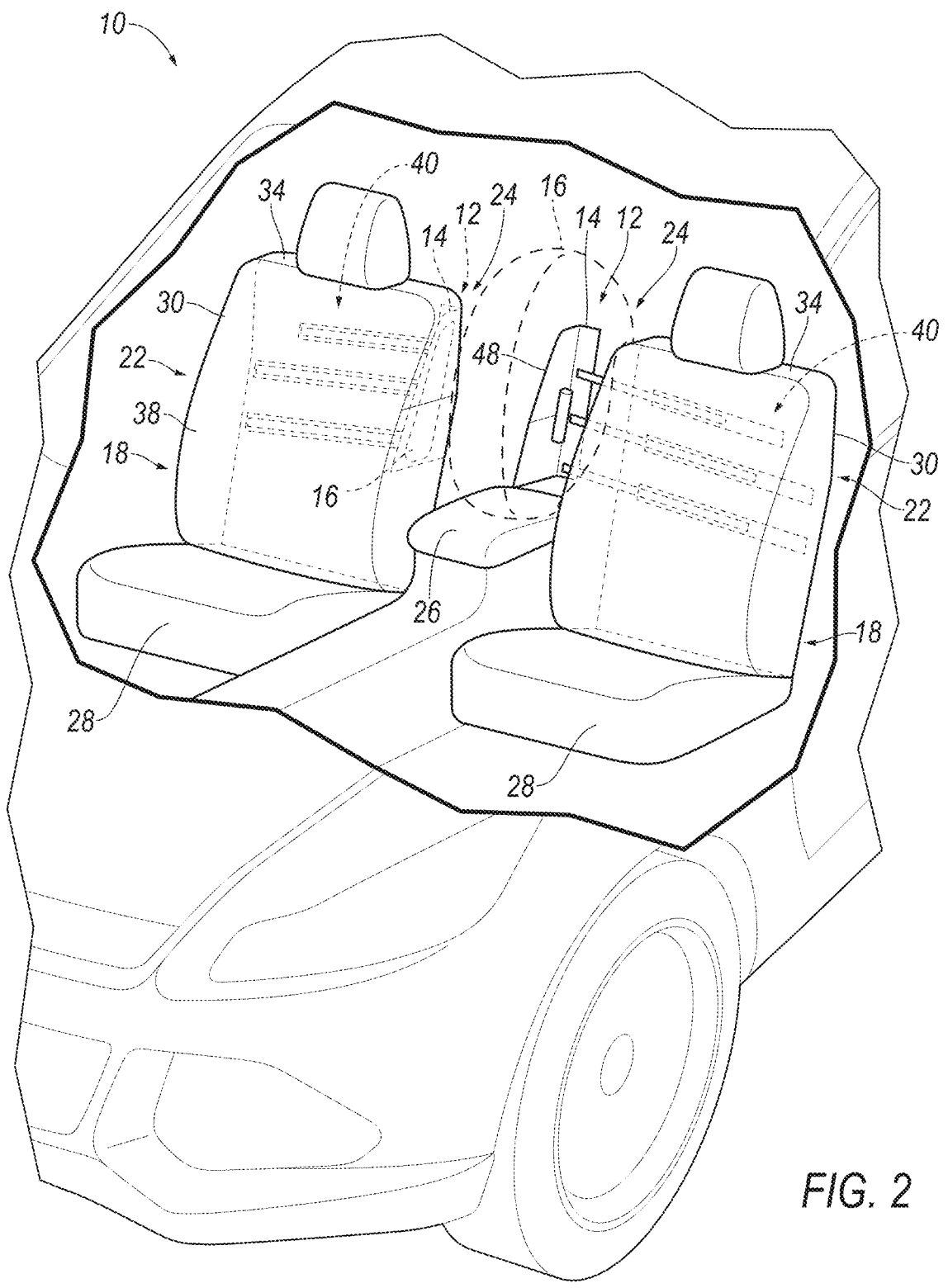
FIG. 2 is the cutaway view of the vehicle of FIG. 1 with one of the side airbag assemblies in the deployed position and an airbag of the side airbag assembly inflated.

The vehicle 10 may include a middle console 26 between two seats 18, e.g., between two front seats 18 as shown in the example in FIGS. 1 and 2. In some examples, the middle console 26 may be on the longitudinal plane P of the vehicle 10, as shown in the example in FIGS. 1 and 2. In other examples, the middle console 26 may be in the middle of two adjacent seats 18 and offset from the longitudinal plane of the vehicle 10.

The middle console 26 may be supported by the floor. Specifically, in such examples, the middle console 26 extends upwardly from the floor between two seats 18. In such an example, the middle console 26 abuts the floor and may be connected to the floor, e.g., with fasteners such as threaded fasteners. The middle console 26 may include a class-A surface exposed to the occupant cabin. A class-A surface is a finished surface free of unaesthetic blemishes and defects and exposed to view by a vehicle 10 occupant seated in the vehicle 10. The middle console 26 may include an armrest designed to support the arm of occupants of the vehicle seated in the seats 18. The middle console 26 may include a storage compartment (not numbered) below the armrest.

The side airbag assembly 12 may be operable to control the kinematics of the occupant of the seat 18 during certain far-side impacts. Far-side impacts include certain impacts to a side of the vehicle 10 opposite the seat 18 from the longitudinal axis. For example, for the front-left seat 18 of the example shown in FIGS. 1 and 2, a far-side impact is an impact to the right side of the vehicle 10. For the front-right seat 18 of the example shown in FIGS. 1 and 2, a far-side impact is an impact to the left side of the vehicle 10. The side airbag assembly 12 is deployable from the undeployed position to the deployed position in a vehicle-inboard direction VI. In some examples, the side airbag assembly 12 may be at the inboard side 24 of seat 18 in the undeployed position. Specifically, in some examples, the side airbag assembly 12 may be at the inboard side 24 of the seatback frame 20 in the undeployed position.

The side airbag assembly 12 includes a deployment assembly 40. The deployment assembly 40 supports the airbag 16 and moves the airbag 16 from the undeployed position to the deployed position. The deployment assembly 40 includes the tray 14 and a track 42. As set forth further below, the track 42 is supported by the seatback frame 20, and the tray 14 moves relative to the track 42 from the undeployed position to the deployed position. The deployment assembly 40 includes an actuator 58 that moves the tray 14 along the track 42 from the undeployed position to the deployed position, as set forth further below. In the example shown in the Figures, the both front seats 18 include a deployment assembly 40 on the inboard side 24 of the seat 18. In other examples, any one or more of the seats 18 can include the deployment assembly 40.

The tray 14 is supported by the seatback frame 20. In other words, the weight of the tray 14 is borne by the seatback frame 20. In the example shown in the Figures, the tray 14 is supported by the seatback frame 20 through the track 42. In the example shown in the Figures, the track 42 is directly connected to the seatback frame 20 and the tray 14 is directly connected to the track 42.

As set forth above, the tray 14 is movable relative to the seatback frame 20 in the inboard direction, i.e., in a direction that extends from the outboard side 22 of the seat 18 to the inboard side 24 of the seat 18. In some examples, the tray 14 is movable relative to the seatback frame 20 in the vehicle-inboard direction VI from the undeployed position to the deployed position.

The tray 14 may be at the inboard side 24 of the seatback frame 20 in the undeployed position, as shown in FIG. 1. The tray 14 may be at an inboard one of the bolsters 38 in the undeployed position. In the undeployed position, the tray 14 may be recessed relative to a portion of the seatback 30, e.g., the cover. For example, the tray 14 may be concealed by the cover of the seatback 30 in the undeployed position. In such examples, the covering 34 may include a tear seam and the tray 14 may break through the tear seam as the tray 14 moves to the deployed position. In other examples, the tray 14 may be exposed in the undeployed position, and in such examples, the tray 14 may have a class-A surface, i.e., a finished surface exposed to view by a customer and free of unaesthetic blemishes and defects. The tray 14 may be vehicle-outboard relative to the middle console 26 in the undeployed position, and the tray 14 may be over the middle console 26 in the deployed position.

The tray 14 may be curved and/or angled so that the tray 14 includes walls that are transverse to each other. In some examples, the tray 14 may be cupped, curved, angled, etc. In the example shown in the Figures, the tray 14 includes a first wall 44 extending in the cross-seat direction and a second wall 46 extending from the first wall 44 in the seat-forward direction SF. The second wall 46 is inboard of the first wall 44. Specifically, the first wall 44 has an inboard end, and the first wall 44 extends in the inboard direction from the inboard end to the second wall 46. The second wall 46 has a forward end 48, and the second wall 46 extends in the forward direction from the first wall 44 to the forward end 48. The first wall 44 may be straight in the cross-seat direction or may have a curve that extends generally in the cross-seat direction CS, and the second wall 46 may be straight in the seat-forward direction SF or may have a curve that extends generally in the seat-forward direction SF. In the example shown in the Figures, the tray 14 curves between the first wall 44 and the second wall 46. The tray 14 may follow the contours of the bolster 38 at which the tray 14 is located in the undeployed position.

The second wall 46 constrains inflation of the airbag 16 as the airbag 16 inflates from an uninflated position to an inflated position when the tray 14 is in the deployed position and/or as the tray 14 moves from the undeployed position to the deployed position. The airbag 16 is mounted to the tray 14 outboard of the second wall 46, and the airbag 16 in the inflated position abuts the second wall 46 and the second wall 46 acts as a reaction surface for the airbag 16. Since the second wall 46 is inboard of the first wall 44, the second wall 46 restrains inboard movement of the airbag 16 as the airbag 16 inflates from the uninflated position to the inflated position when the tray 14 is in the deployed position and/or as the tray 14 moves from the undeployed position to the deployed position.

The airbag 16 may inflate between the tray 14 and the bolster 38 adjacent the tray 14 when the tray 14 is in the deployed position and/or as the tray 14 moves to the deployed position. A base portion of the airbag 16 may be constrained between the bolster 38 and the second wall 46 of the tray 14 in the inflated position. In some examples, including the example shown in the Figures, the airbag 16 in the inflated position may extend in the seat-forward direction SF farther than the tray 14, and in such examples, the second wall 46 constrains inboard movement of the airbag 16 at a base portion the airbag 16 that abuts the tray 14.

As shown in FIGS. 2-6, at least a portion of the tray 14 may be shaped to angle vehicle inboard at a top portion of the tray 14. In such an example, a top portion 50 of the airbag 16 bends toward an upright midline of the seatback 30, i.e., in a seat-inboard direction. The top portion 50 of the tray 14 positions a top portion of the airbag 16 to be closer to the upright midline of the seatback 30. In the example shown in the Figures, the second wall 46 includes a bottom portion 52 and the top portion 50 extends from the bottom portion 50 toward an upright midline M of the seatback frame 20.

The tray 14 is rigid relative to the airbag 16 so that the tray 14 acts as a reaction surface for the airbag 16 as the airbag 16 inflates to the inflated position. The tray 14 may be, for example, plastic, metal, etc.

The track 42 is between the tray 14 and the seatback frame 20. The tray 14 moves along the track 42 from the undeployed position to the deployed position.

The track 42 is supported by the seatback frame 20. In other words, the weight of the track 42 is borne by the seatback frame 20. In some examples, part of the track 42 is fixed to the seatback frame 20 and remains stationary relative to the seatback frame 20 when the tray 14 moves from the undeployed position to the deployed position, and part of the track 42 is fixed to the tray 14 and moves with the tray 14 from the undeployed position to the deployed position.

In the example shown in the Figures, the track 42 includes a rail 54 fixed to the seatback frame 20 and a sliding member 56 fixed to the tray 14, e.g., by welding, threaded fastener, etc. The sliding member 56 is slidably engaged with the rail 54. In some examples, the rail 54 and the sliding member 56 are components separate from and fixed to the seatback frame 20 and the tray 14, respectively. In other examples, the track 42, e.g., the rail 54 and/or the sliding member 56, may be features formed in the seatback frame 20 and/or the tray 14, e.g., voids, channels, etc. In some examples, the rail 54 may be unitary with the seatback frame 20 and/or the sliding member 56 may be unitary with the tray 14. In this context, unitary means a single, uniform piece of material with no seams, joints, fasteners, or adhesives holding it together, i.e., formed together simultaneously as a single continuous unit, e.g., by machining from a unitary blank, molding, forging, casting, etc. Non-unitary components, in contrast, are formed separately and subsequently assembled, e.g., by threaded engagement, welding, etc.

Figure 3:
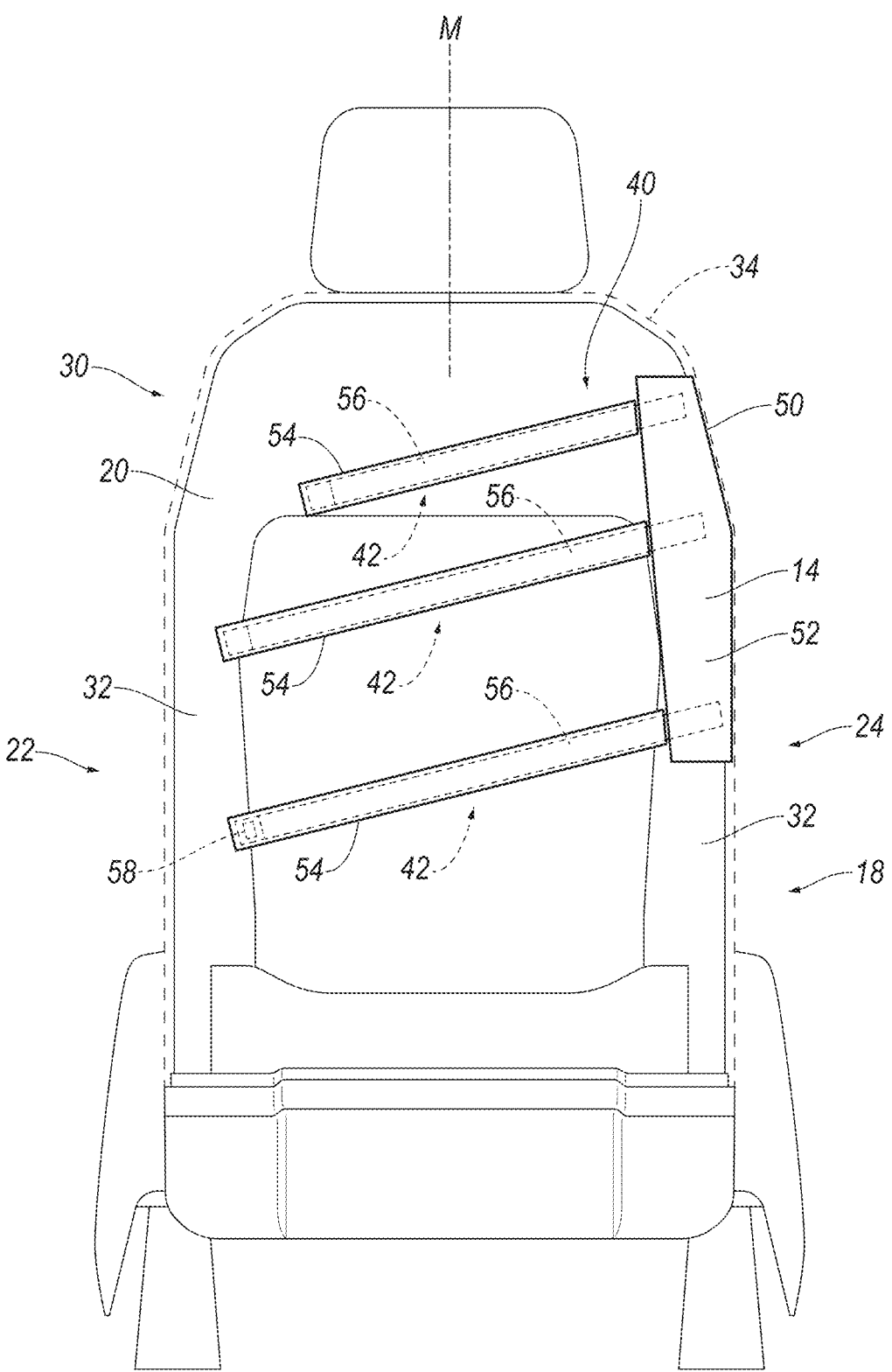
FIG. 3 is a rear view of one of the seats with a covering of the seat shown in broken lines to show the side airbag assembly on a frame of a seatback of the seat.
Figure 4:
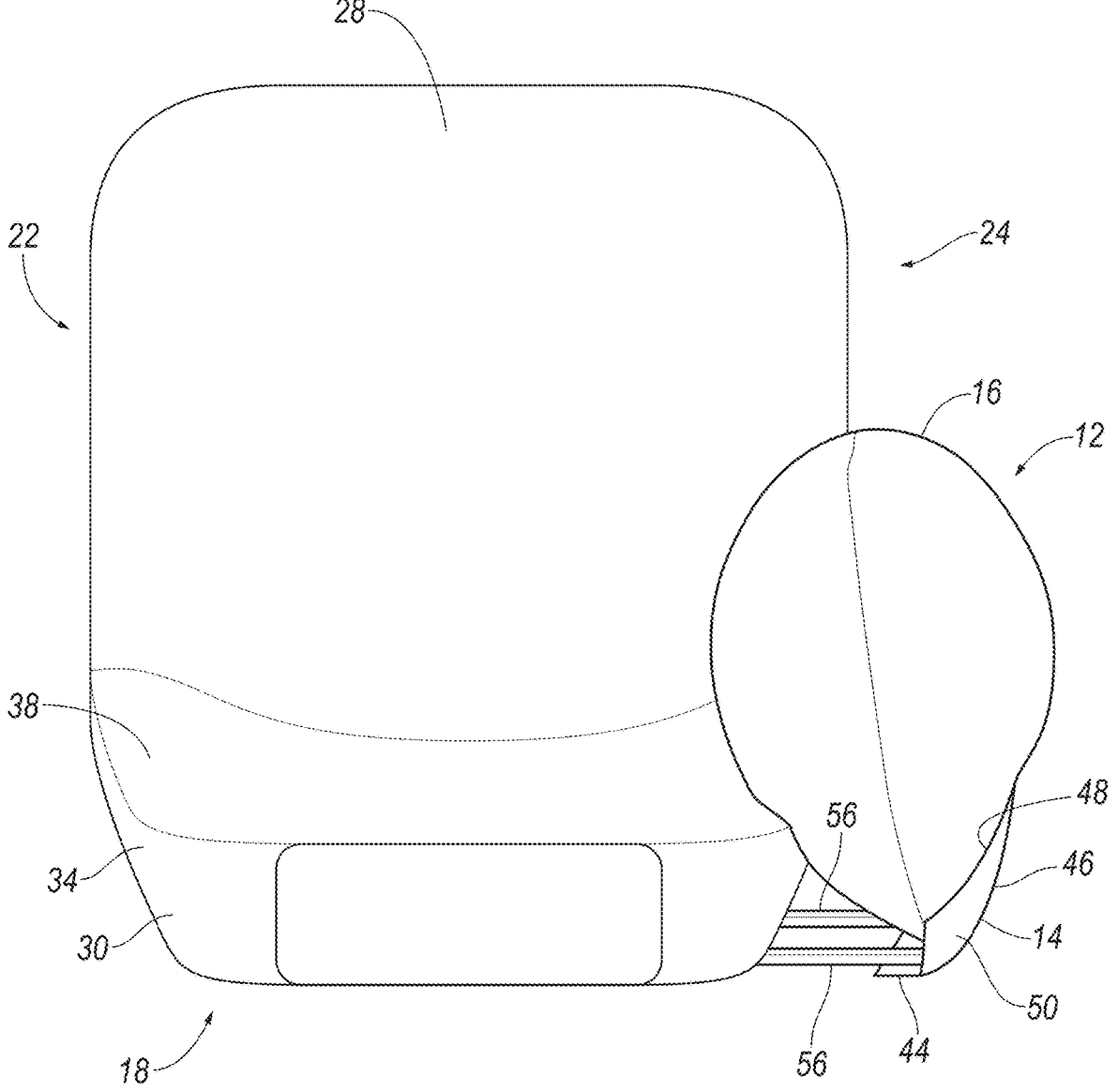
FIG. 4 is a top view of the seat with an example of the side airbag assembly in the deployed position and the airbag inflated.
Figure 5:
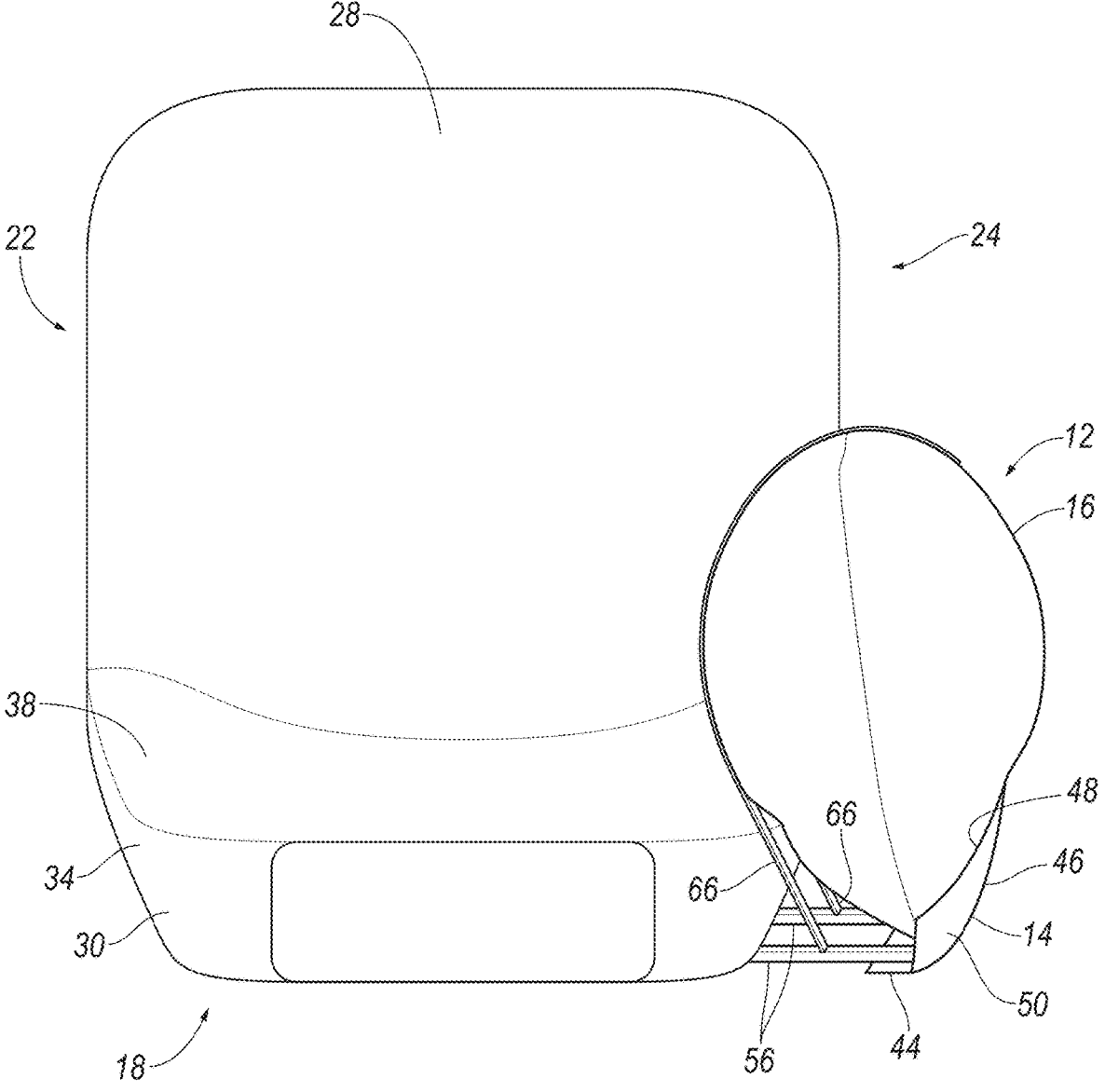
FIG. 5 is a top view of the seat with another example of the side airbag assembly in the deployed position and the airbag inflated.
Figure 6:
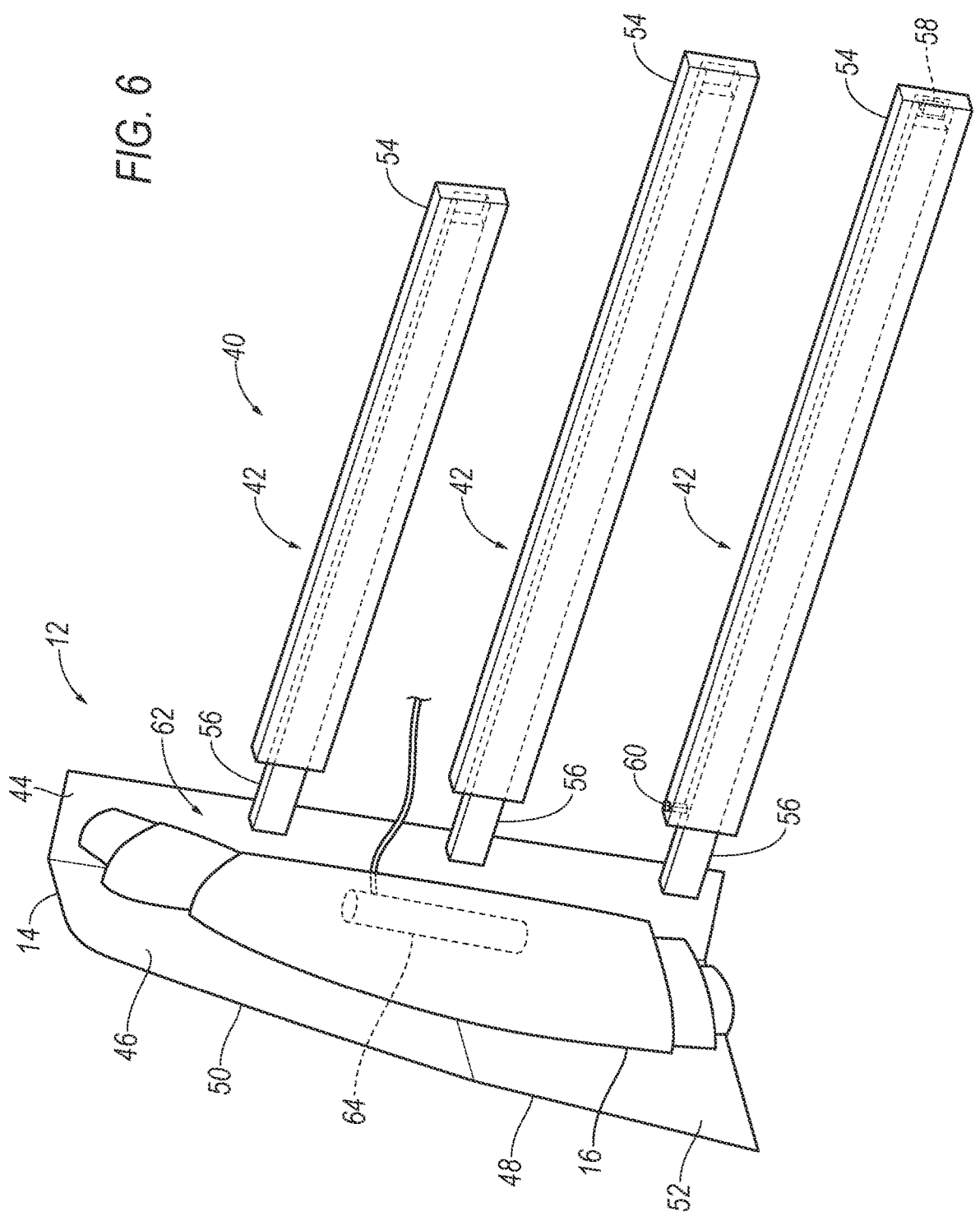
FIG. 6 is a perspective view of the side airbag assembly.
Figure 7:
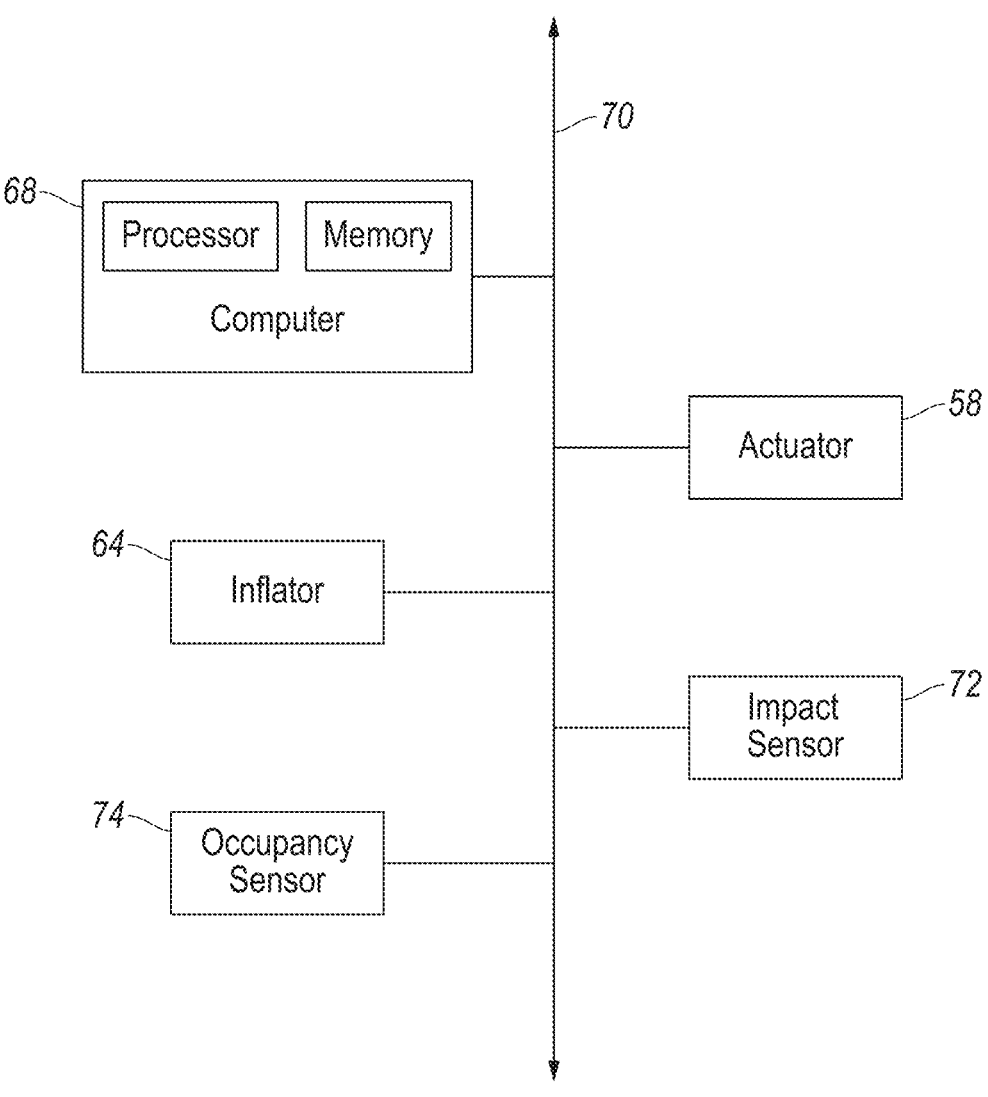
FIG. 7 is a block diagram of a system of the vehicle.

In the example shown in FIGS. 3-5, the rail 54 is tubular and telescopically receives the sliding member 56 with a sliding fit. Specifically, the rail 54 defines a bore and the sliding member 56 slides in the bore relative to the rail 54. In other examples, the sliding member 56 may define a bore that receives the rail 54. In the example shown in FIGS. 3-5, the deployment assembly 40 includes three rails 54 and three sliding members 56 paired with each other, respectively. In other examples, the deployment assembly 40 may include any suitable pairs of rails 54 and corresponding sliding members 56, i.e., one or more pairs. The rail 54 is supported by the seatback frame 20. In other words, the weight of the rail 54 is borne by the seatback frame 20. The tray 14 is supported by the seatback frame 20, i.e., the weight of the tray 14 is borne by the seatback frame 20. In the example shown in the Figures, the tray 14 is supported by the seatback frame 20 through the track 42, e.g., through the rail 54 and the sliding member 56 in the example shown in the Figures.

The tray 14 may move upwardly, in addition to inwardly, from the undeployed position to the deployed position. In the example shown in FIGS. 3-5, the rails 54 angle upwardly in the inboard direction. Specifically, the rail 54 has a first end and a second end spaced from the first end in the inboard direction, and the second end is higher than the first end.

The deployment assembly 40 includes an actuator 58 to move the tray 14 from the undeployed position to the deployed position. The actuator 58 is between the seatback frame 20 and the tray 14 to move the tray 14 from the undeployed position to the deployed position. In the example shown in the Figures, the actuator 58 is between the rail 54 and the sliding member 56 to move the sliding member 56 relative to the rail 54. Specifically, the actuator 58 shown in the example in the Figures is disposed in the bore of the rail 54. In such an example, the actuator 58 may slide the sliding member 56 relative to the rail 54 by building pressure in the bore or by pushing the sliding member 56. The actuator 58 may be a linear actuator. As one example, the actuator 58 may be a pyrotechnic actuator. In such an example, the actuator 58 includes a pyrotechnic charge that can be activated to move the sliding member 56 relative to the rail 54. The activation of the pyrotechnic charge may, for example, extend a piston of the actuator 58 to move the sliding member 56. The pyrotechnic charge may be combustible to produce a gas. The pyrotechnic charge may be formed of a solid mixture of substances that, when ignited, react to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$). In the example shown in the Figures, the deployment assembly 40 includes one actuator 58 that acts on one sliding member 56, which moves the other sliding members 56 through the tray 14. In other examples, the deployment assembly 40 may include any suitable number of actuators 58 in any suitable position.

The deployment assembly 40 may include a lock that prevents movement of the deployment assembly 40 from the undeployed position to the deployed position in the absence of activation by the activator. The lock may be electronically actuatable, e.g., by a computer of the vehicle 10, or mechanically actuatable, e.g., releasable under forces that exceed a predetermined threshold force corresponding to the force generated by the actuator 58.

The deployment assembly 40 may include a stop 60 that prevents movement of the tray 14 inboard beyond the deployed position. In the example shown in the Figures, the stop 60 stops movement of the sliding member 56 relative to the rail 54 when the tray 14 reaches the deployed position. The stop 60 may be electronically actuatable, e.g., by a computer of the vehicle 10, or mechanically actuatable, e.g., triggered when the sliding member 56 reaches a position along the rail 54. In the example shown in the Figures, the deployment assembly 40 includes one stop 60 that acts on one sliding member 56 to stop the sliding members 56 and the tray 14 in the deployed position. In other examples, the deployment assembly 40 may include any suitable number of stops 60 in any suitable position.

The vehicle 10 includes an airbag assembly 62 including the airbag 16. The airbag assembly 62 includes an inflator 64 and may include a housing. The inflator 64 inflates the airbag 16 to the inflated position.

The airbag 16 is supported by the tray 14 and is movable with the tray 14 from the undeployed position to the deployed position. In other words, the weight of the airbag 16 is borne by the tray 14 when the airbag 16 is uninflated and when the airbag 16 is inflated. The airbag 16 is fixed to the tray 14, e.g., by direct attachment to the tray 14 or by attachment to the tray 14 through the inflator 64 and/or the housing. As an example, the airbag 16 may be attached directly to the housing with clips, threaded fasteners, etc. In examples including the housing, the housing houses the airbag 16 in the uninflated position and supports the airbag 16 in the inflated position. The airbag 16 may be rolled and/or folded to fit within the housing in the uninflated position. The housing may be of any suitable material, e.g., a rigid polymer, a metal, a composite, or a combination of rigid materials. The airbag 16 housing may, for example, include clips, threaded fasteners, etc., for attaching the housing to the tray 14.

In some examples, the airbag 16 may be tethered to the tray 14 with one or more tethers. In the example shown in FIG. 5, a tether 66 extends between a forward end of the airbag 16 and the first wall 44 of the tray 14. In such an example, the tether 66 resists outboard rotation of the airbag 16 in the inflated position.

The airbag 16 may be fabric, e.g., a woven polymer yarn. The woven polymer yarn may be, for example, nylon 6, 6. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

The inflator 64 is in fluid communication with the airbag 16. The inflator 64 expands the airbag 16 with inflation medium, such as a gas, to move the airbag 16 from the uninflated position to the inflated position. In some examples, the inflator 64 may be fixed to (e.g., with threaded fasteners, straps, etc.) and supported by the tray 14 and moves with the tray 14 from the undeployed position to the deployed position, as shown in the example in the Figures. In such an example, the inflator 64 may be, for example, at least partially in the inflation chamber to deliver inflation medium directly to the inflation chamber or may be connected to the inflation chamber through fill tubes, diffusers, etc. In other examples, the inflator 64 may be connected directly to the seatback frame 20 and fluidly connected to the airbag 16 through fill tubes, diffusers, etc. The inflator 64 may be, for example, a pyrotechnic inflator 64 that ignites a chemical reaction to generate the inflation medium, a stored gas inflator 64 that releases (e.g., by a pyrotechnic valve) stored gas as the inflation medium, or a hybrid.

The vehicle 10 may include a computer 68 having a processor and a memory storing instructions executable by the processor to deploy the airbag 16. The computer 68 may be, for example, a restraints control module. Use of "in response to" and "based on" herein indicates a causal relationship, not merely a temporal relationship.

The computer 68 includes a processor and a memory such as are known. The memory includes one or more forms of computer readable media, and stores instructions executable by the computer 68 for performing various operations, including as disclosed herein.

Via a vehicle 10 network, the computer 68 may transmit messages to various devices in the vehicle 10 and/or receive messages (e.g., CAN messages) from the various devices, e.g., sensors, the actuator 58, the inflator 64, an human machine interface (HMI), etc. Alternatively or additionally, in cases where the computer 68 includes a plurality of devices, a vehicle communication network 70 may be used for communications between devices represented as the computer in this disclosure. Further, as mentioned below, various controllers and/or sensors may provide data to the computer via the vehicle communication network 70. The communication network 70 can include a bus in the vehicle 10 such as a controller area network (CAN) or the like, and/or other wired and/or wireless mechanisms. Via the vehicle 10 network, the computer 68 may transmit messages to various devices in the vehicle 10 and/or receive messages (e.g., CAN messages) from the various devices, e.g., sensors, an actuator, an human machine interface (HMI), etc.

The computer 68 is a microprocessor-based controller implemented via circuits, chips, or other electronic components. The computer 68 includes a processor and a memory. The memory includes one or more forms of computer readable media, and stores instructions executable by the computer 68 for performing various operations, including as disclosed herein. The computer 68 may be programmed to execute operations disclosed herein. The memory stores instructions executable by the processor to execute the operations disclosed herein and electronically stores data and/or databases. For example, the computer 68 may include one or more dedicated electronic circuit including an ASIC (Application Specific Integrated Circuit) that is manufactured for a particular operation. In another example, the computer 68 may include an FPGA (Field Programmable Gate Array) which is an integrated circuit manufactured to be configurable by a customer. As an example, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, and logical components inside an FPGA may be configured based on VHDL programming, e.g., stored in a memory electrically connected to the FPGA circuit. In some examples, a combination of processor(s), ASIC(s), and/or FPGA circuits may be included inside a chip packaging. The computer may be a set of computers communicating with one another.

The vehicle 10 may include at least one impact sensor 72 for sensing certain vehicle impacts (e.g., impacts of a certain magnitude, direction, etc.), and the computer 68 in communication with the impact sensor 72, the actuator 58 of the deployment assembly 40, and the inflator 64. The computer 68 may activate the inflator 64, e.g., provide an impulse to a pyrotechnic charge of the inflator 64 when the impact sensor 72 senses certain vehicle impacts. The impact sensor 72 may be configured to sense certain vehicle impacts prior to impact, i.e., pre-impact sensing. The impact sensor 72 may be in communication with the computer 68. The impact sensor 72 is configured to detect certain vehicle impacts. In other words, a "certain vehicle impact" is an impact of the type and/or magnitude for which inflation of the airbag 16 is designed i.e., "certain" indicates the type and/or magnitude of the impact. The type and/or magnitude of such "certain vehicle impacts" may be pre-stored in the computer 68, e.g., a restraints control module and/or a body control module. The impact sensor 72 may be of any suitable type, for example, post contact sensors such as accelerometers, pressure sensors, and contact switches; and pre-impact sensor 72s such as radar, LIDAR, and vision sensing systems. The vision sensing systems may include one or more cameras, CCD image sensors, CMOS image sensors, etc. The impact sensor 72 may be located at numerous points in or on the vehicle 10.

The vehicle 10 may include an occupant detection system including at least one occupancy sensor 74. One or more occupancy sensor 74 may determine whether an occupant is seated in the seat 18, i.e., may be configured to at least detect occupancy of the seat 18.

One or more occupancy sensor 74 of the occupant detection system may detect an occupant between two adjacent seats 18 of the vehicle 10. As an example, at least one occupancy sensor 74 may detect an occupant occupying a space between the two front seats 18 of the vehicle 10, e.g., the space over a middle console 26. One example of an occupant between the two front seats 18 is an occupant leaning forward from a rear seat 18 between the two front seats 18. As set forth further below, in the event an occupant is between the two front seats 18, the airbag 16 may be inflated while the tray 14 remains in the undeployed position. In such an example, the airbag 16 inflates forward between the bolster 38 and the tray 14 in the undeployed position.

The occupancy sensors 74 may be visible light cameras or infrared cameras directed at the seat 18, pressure sensors inside the seat 18, sensors detecting whether a seatbelt for the seat 18 is buckled, millimeter-wave radar sensors, or other suitable sensors. The occupancy sensor is in communication with the computer via the communications network.

Figure 8:
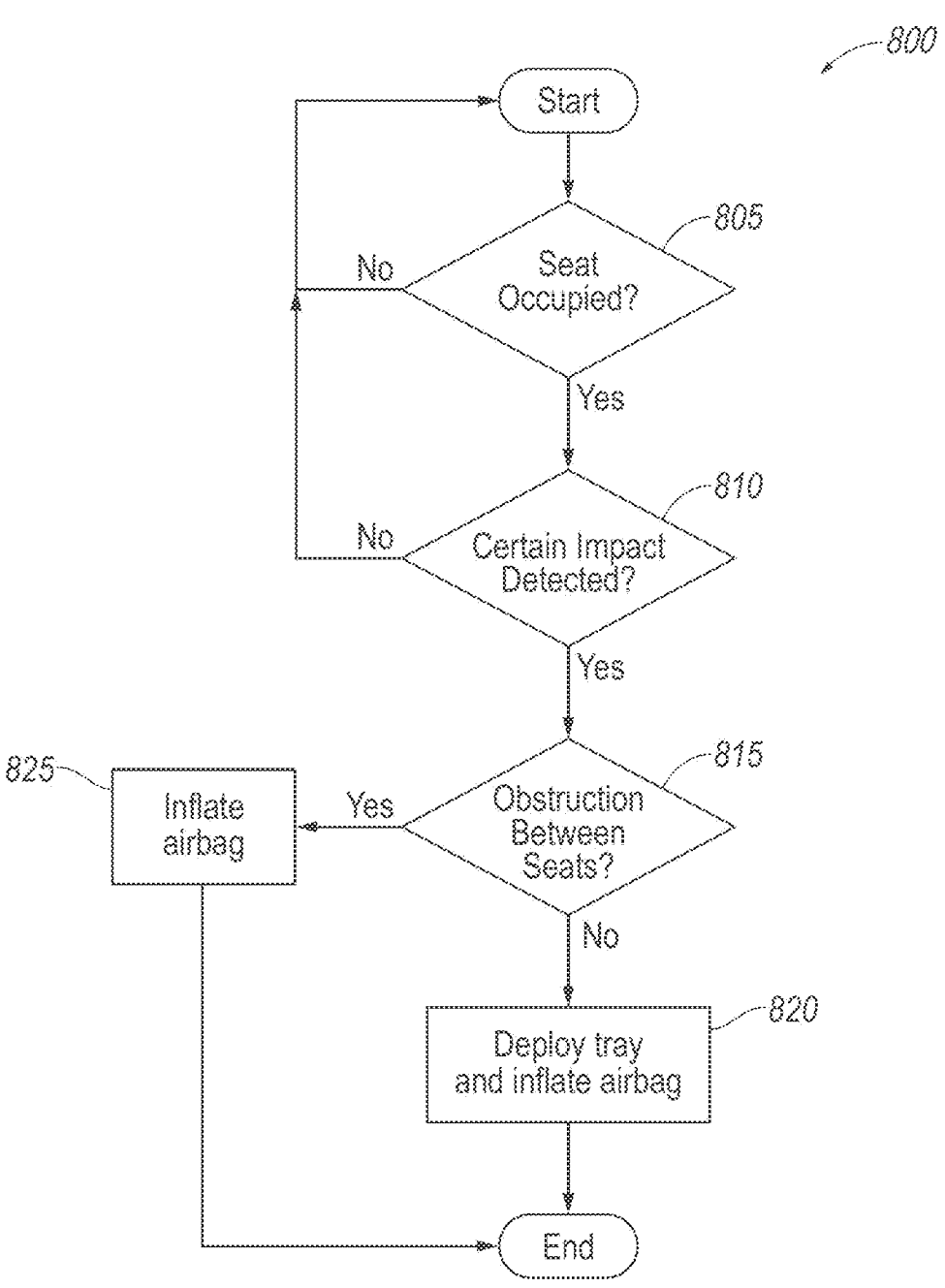
FIG. 8 is a flow chart of an example method.

With reference to FIG. 8, method 800 performs selective inflation of the airbag 16 and deployment of the tray 14. In block 805, the method 800 includes determining whether a seat 18 is occupied. Seat 18 occupation by a human occupant may be detected by the occupancy sensor, as described above. In block 810, the method 800 includes detecting certain vehicle impacts. As described above, certain vehicle impact may be detected by the impact sensor 72 and communicated from the impact sensor 72 to the computer 68.

The method 800 includes actuating the actuator 58 in response to detection of certain vehicle impact and detection of absence of an occupant vehicle inboard of the seatback frame 20. Specifically, in block 815, the method 800 includes detecting obstruction between the two front seats 18, and more specifically, includes detecting an occupant from a rear row of seats 18 occupying the space between the two front seats 18. The detection of an occupant between the two front seats 18 may be made by one or more occupancy sensors 74 of the occupant detection system, as set forth above.

In the event certain vehicle impact is detected and no obstruction is detected between the two front seats 18, e.g., that no occupant from a rear seat 18 is leaning forward between the two front seats 18, the method 800 includes deploying the tray 14 to the deployed position and inflating the airbag 16, as shown in block 820. In the event certain vehicle impact is detected and an obstruction is detected between the two front seats 18, e.g., an occupant from a rear seat 18 is leaning forward between the two front seats 18, the method 800 includes inflating the airbag 16 with the tray 14 in the undeployed position, as shown in block 825. In other words, the method 800 does not activate the actuator 58 to move the tray 14 to the deployed position in block 825.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle seat comprising:
   a seatback frame having an outboard side and an inboard side spaced from the outboard side in an inboard direction;
   a tray supported by the seatback frame and being movable relative to the seatback frame in the inboard direction from an undeployed position to a deployed position;
   an airbag supported by the tray and movable with the tray in the inboard direction from the undeployed position to the deployed position; and
   a rail fixed to the seatback frame and a sliding member fixed to the tray, the sliding member being slidably engaged with the rail in the inboard direction;
   the tray including a first wall and a second wall, the first wall extending in the inboard direction from the sliding member to the second wall, and the second wall extending from the first wall in a seat-forward direction in the undeployed position and in the deployed position;
   the airbag includes a base portion constrained between the inboard side and the second wall of the tray in the deployed position;
   the airbag in the deployed position extending from the first wall in the seat-forward direction farther than the second wall extends from the first wall.

2. The vehicle seat as set forth in claim 1, wherein the tray is at the inboard side of the seatback frame in the undeployed position.

3. The vehicle seat as set forth in claim 1, further comprising an actuator between the rail and the sliding member to move the sliding member relative to the rail.

4. The vehicle seat as set forth in claim 1, further comprising a pyrotechnic actuator between the seatback frame and the tray to move the tray from the undeployed position to the deployed position.

5. The vehicle seat as set forth in claim 1, wherein the rail has a first end and a second end spaced from the first end in the inboard direction, the second end being higher than the first end.

6. The vehicle seat as set forth in claim 1, further comprising an inflator in fluid communication with the airbag, the inflator being supported by the tray and moveable with the tray from the undeployed position to the deployed position.

7. The vehicle seat as set forth in claim 1, wherein the second wall includes a bottom portion and a top portion extending from the bottom portion toward an upright midline of the seatback frame.

8. The vehicle as set forth in claim 1, wherein the second wall includes a bottom portion and a top portion extending from the bottom portion in a vehicle-outboard direction.

9. The vehicle as set forth in claim 1, wherein the airbag inflates between the tray and the inboard side when the tray is in the deployed position.

10. A vehicle comprising:
    a seatback frame;
    a tray supported by the seatback frame and being movable relative to the seatback frame in a vehicle-inboard direction from an undeployed position to a deployed position;
    an airbag supported by the tray and movable with the tray from the undeployed position to the deployed position;
    a rail fixed to the seatback frame and a sliding member fixed to the tray, the sliding member being slidably engaged with the rail in the vehicle-inboard direction;
    an actuator between the seatback frame and the tray to move the tray from the undeployed position to the deployed position;

the tray including a first wall and a second wall, the first wall extending in the vehicle-inboard direction from the sliding member to the second wall, and the second wall extending from the first wall in a vehicle-forward direction in the undeployed position and in the deployed position;

the airbag includes a base portion constrained between the seatback frame and the second wall of the tray in the deployed position;

the airbag in the deployed position extending from the first wall in the seat-forward direction farther than the second wall extends from the first wall; and a computer having a processor and memory storing instructions executable by the processor to actuate the actuator in response to detection of certain vehicle impacts and detection of absence of an occupant vehicle inboard of the seatback frame.

11. The vehicle as set forth in claim 10, further comprising an inflator in fluid communication with the airbag, the memory storing instructions executable by the processor to actuate the inflator in response to detection of certain vehicle impacts.

12. The vehicle as set forth in claim 11, wherein the inflator is supported by the tray and is moveable with the tray from the undeployed position to the deployed position.

13. The vehicle as set forth in claim 10, wherein the actuator is a pyrotechnic actuator.

\* \* \* \* \*